Patented June 28, 1932

1,864,777

UNITED STATES PATENT OFFICE

URLYN C. TAINTON, OF ST. LOUIS, MISSOURI

RECOVERY OF METALS FROM ZINC PLANT RESIDUE

No Drawing.    Application filed November 13, 1929. Serial No. 407,002.

This invention relates to improvements in electrolytic recovery of metals from zinc plant residues and especially to a method of rendering hydrated ferric oxide non-adsorptive to other metals.

The residues from electrolytic zinc plants contain usually, substantial amounts of zinc and lead together with some silver, gold and a little copper. The treatment of this material for the recovery of lead value by ordinary smelting methods is unsatisfactory because of its finely divided nature, the fact that the lead is present as sulphate, and because of the zinc content.

Various attempts have been made to treat the material by leaching, for which it appears to be preeminently suitable but difficulties are encountered in obtaining good extractions of the lead and precious metals. I have found that the major difficulty is caused by the adsorptive powers of hydrated ferric oxide always present in zinc plant residues. This substance absorbs the lead and silver from the solvent employed to bring them into solutions and consequently poor extractions are obtained.

The present invention relates to a method of dealing with this problem when using a solution containing caustic soda in which the lead is dissolved as sodium plumbite. I have found that the adsorptive power of the hydrated ferric oxide can be, to a large extent, eliminated by heating the material to a temperature about 450° C. The action is enhanced if a small quantity, say two to three per cent by weight, of common salt, sodium chloride, be added before or during the roasting operation. Better results also are obtained by the admixture of finely ground iron pyrites to the extent of about ten per cent of the weight of the residue treated. In this later case, the heating or roasting treatment of the residue must be carried on in the presence of sufficient oxygen to oxidize the sulphur in the iron pyrites.

The above treatment not only makes it possible to dissolve the lead and silver in a caustic soda solution, but it also renders soluble in water, a substantial amount of the zinc and copper left unextracted from the original sulphuric acid leach. By water-washing this calcine, therefore, the zinc and copper may be dissolved out and may be recovered from the solution in suitable ways. A preferred method of doing this is to employ an emulsion of lime which precipitates the zinc and copper as hydrates which may then be separated from the solution and returned to the zinc leaching plant. The residue may then be leached with a caustic soda solution as described in my co-pending application entitled "Method for recovery of lead and other metals from ores or other lead bearing materials" filed September 19th, 1927, Serial Number 220,358, for the recovery of the lead values, and with cyanide solution for the recovery of the silver and gold values. The sulphate introduced into the solution from the lead sulphate in the material treated may be dealt with by means described in my co-pending application entitled "Improvements in the hydro-metallurgical recovery of lead from ores and other lead bearing materials," filed November 22, 1929, Serial Number 409,184.

By working in this way a good recovery may be made of all of the metal values in the residue, while in any smelting method it would be necessary to sacrifice at least two of them.

Having thus described my invention, what I claim and desire to secure by Letters Patent is—

1. In the recovery of metals from zinc plant residues previously roasted and leached under conditions such as to precipitate hydrated ferric oxide in the material, the step which consists in driving off the combined water from the hydrated ferric oxide by heat treatment, and subsequently leaching the material to dissolve the metal values.

2. In the recovery of metals from zinc plant residues, previously roasted and leached under conditions such as to precipitate hydrated ferric oxide in the material, the steps which consist in adding sodium chloride to the residue and subjecting the residue together with the sodium chloride added thereto to a heating action to drive off the combined water from the hydrated ferric oxide, and subsequently leaching the material to dissolve the metal values.

3. In the recovery of metals from zinc plant residues previously roasted and leached under conditions such as to precipitate hydrated ferric oxide in the material, the steps which consist in mixing finely ground iron pyrites with the residue and subjecting the mixture to a heating action in the presence of oxygen to oxidize the sulphur in the iron pyrites and to drive off the combined water from the hydrated ferric oxide, and subsequently leaching the material to dissolve the metal values.

4. In the hydro-metallurgical treatment of zinc plant residues previously roasted and leached under conditions such as to precipitate hydrated ferric oxide in the material, the steps which consist in heating the material to a temperature sufficient to destroy the adsorptive powers of the hydrated iron oxide and leaching the material with water to extract zinc and copper.

5. In the hydro-metallurgical treatment of zinc plant residues containing hydrated ferric oxide, the steps which consist in heating the material to a temperature sufficient to destroy the adsorptive powers of the hydrated iron oxide, leaching the material with water to extract zinc and copper, and leaching the residue with alkaline hydroxide solution to dissolve the lead.

6. In the hydro-metallurgical treatment of zinc plant residues containing hydrated ferric oxide, the steps which consist in heating the material to a temperature sufficient to destroy the adsorptive powers of the hydrated iron oxide, leaching the material with water to extract zinc and copper, leaching the residue with alkaline hydroxide solution to dissolve the lead and leaching with cyanide solution to dissolve the gold and silver.

7. In a hydro-metallurgical treatment of zinc plant residues previously roasted and leached under conditions such as to precipitate hydrated ferric oxide in the material, the step which consists in heating the residue to a temperature exceeding 450° C. to drive off the combined water from the hydrated ferric oxide so as to destroy the adsorptive powers of the hydrated ferric oxide, and subsequently leaching the material to dissolve the metal values.

URLYN C. TAINTON.